United States Patent [19]

Tadmor

[11] Patent Number: 5,356,208
[45] Date of Patent: Oct. 18, 1994

[54] SCREW ELEMENT HAVING SHEARING AND SCRAPING FLIGHTS

[76] Inventor: Zehev Tadmor, 62 Tishbi Street, Haifa, Israel

[21] Appl. No.: 43,742

[22] Filed: Apr. 7, 1993

[51] Int. Cl.[5] .............................................. B29B 1/06
[52] U.S. Cl. ...................................... 366/79; 366/84; 366/89
[58] Field of Search ....................... 366/90, 79, 81, 83, 366/84, 86, 85, 88, 89, 90, 91, 96, 97, 98, 99, 322, 323, 324, 297; 425/208, 209

[56] References Cited

U.S. PATENT DOCUMENTS

| | | |
|---|---|---|
| 3,866,890 | 2/1975 | Tadmor et al. . |
| 3,924,842 | 12/1975 | Klein et al. . |
| 4,049,245 | 9/1977 | Tadmor et al. . |
| 4,107,788 | 8/1978 | Anders ................................ 366/90 |
| 4,142,805 | 3/1979 | Tadmor . |
| 4,152,077 | 5/1979 | Hold et al. . |
| 4,194,841 | 3/1980 | Tadmor . |
| 4,201,481 | 6/1980 | Iddon et al. . |
| 4,207,004 | 6/1980 | Hold et al. . |
| 4,213,710 | 7/1980 | Hold et al. . |
| 4,227,816 | 10/1980 | Hold et al. . |
| 4,255,059 | 3/1981 | Hold et al. . |
| 4,289,319 | 9/1981 | Hold et al. . |
| 4,300,842 | 11/1991 | Hold et al. . |
| 4,329,065 | 5/1982 | Hold et al. . |
| 4,389,119 | 6/1983 | Valsamis et al. . |
| 4,421,412 | 12/1983 | Hold et al. . |
| 4,486,099 | 12/1984 | Tadmor . |
| 4,529,320 | 7/1985 | Mehta et al. . |
| 4,606,646 | 8/1986 | Mehta et al. . |
| 4,925,313 | 5/1990 | Nunn ................................... 366/90 |

FOREIGN PATENT DOCUMENTS

| | | |
|---|---|---|
| 1044041 | 4/1956 | Fed. Rep. of Germany . |
| 1492590 | 11/1977 | Fed. Rep. of Germany . |
| 2824589 | 12/1979 | Fed. Rep. of Germany . |
| 2934297 | 3/1981 | Fed. Rep. of Germany . |
| 2936592 | 3/1981 | Fed. Rep. of Germany . |
| 3519291 | 12/1986 | Fed. Rep. of Germany . |
| 3902666 | 11/1989 | Fed. Rep. of Germany . |
| 65226 | 2/1956 | France . |
| 96315 | 6/1972 | France . |
| 2342151 | 9/1977 | France . |
| 2483319 | 12/1981 | France . |
| 2111397 | 7/1983 | United Kingdom . |

OTHER PUBLICATIONS

International Polymer Processiong, Hanser Publishers, Munich 1990 (no month).
Berstorff Technische Information, "Single Screw Compounder" KE-C.
Plastics Engineering Handbook of the Society of Plastics Industry, Inc., Fourth Edition, edited by Joel Frados, 1976 (no month).
European Search Report for corresponding European Patent Application No. 93,106,924 dated Oct. 6, 1993.

*Primary Examiner*—Robert W. Jenkins
*Attorney, Agent, or Firm*—Lerner, David, Littenberg, Krumholz & Mentlik

[57] ABSTRACT

A machine for processing solid and viscous plastic materials includes a screw element having a shearing flight and a scraping flight. Upon rotation of the screw, the shearing flight shears the plastic material and the scraping flight guides the material to the shearing flight. Preferably, the screw includes a plurality of threads which extend from one end of the screw to the other, and which include a plurality of shearing and scraping flights.

41 Claims, 8 Drawing Sheets

SCREW ELEMENT HAVING SHEARING AND SCRAPING FLIGHTS

Some of the most difficult mixing or compounding jobs are those that involve dispersion of solids in a viscous matrix such as a fluid polymeric material. For example, in compounding rubber for tires and other applications, carbon black is dispersed into a rubber matrix. Similarly, the dispersion of inorganic and organic pigments as well as many other solid additives into plastics is another common practice in the compounding field.

Successful compounding generally requires both dispersive mixing and extensive mixing. One manner of accomplishing successful dispersive mixing is to expose the fluid elements containing the solids to high shear stresses in order to rupture the solids into fragments. Presently available mixers generate such stresses by passing material to be compounded through narrow gap regions in the mixer, thus creating high shear rates. Multiple passes of the same material through the narrow gap regions is desired in order to reduce the size of the agglomerates to acceptable levels.

Extensive mixing involves mixing various portions of the matrix with one another. Thus, after the ruptured solid particles and surrounding matrix pass through the narrow gap region, this part of the matrix must be mixed back into the rest of the matrix for composition uniformity.

Many commercial mixers include narrow gap regions for dispersive mixing. For example, the narrow gap region is present in the nip of a roll mill mixer, in the gap between the tip of a Banbury type rotor and wall, in the gap between the tip of the kneading element and the barrel in an intermeshing twin screw extruder, and in the clearance between the mixing pin and the disk in a corotating disk processor. While these commercial mixers are effective in dispersive mixing, they are quite expensive and complex compared to single screw extruders.

Screw type processing equipment such as single screw extruders are the most popular continuous processors of plastics and rubber. Such extruders have numerous desirable features including simplicity, relatively low cost, high throughput and versatility. However, application of single screw extruders and other similar processing equipment in the field of compounding has been rather limited. Although single screw extruders can be designed to provide good extensive mixing, they generally provide poor dispersive mixing. Only a small fraction of the processed material ever experiences high stresses in narrow gap regions or flight clearances between the flights of the screw and the barrel. Only a negligible amount of material passes repeatedly through these clearances. Even if the size of the flight clearance or radial distance between the flights and the barrel were increased to increase the number of passes through the flight clearances, the same material would stay close to the barrel as the flight clearance passes by, with little mixing or exchange of material. In other words, the same material would pass repeatedly through the flight clearance or gap with the bulk of material not having a chance to pass through the flight clearance at all. As a result, there would be a loss of output, poor heat removal, poor melting, and other detrimental effects.

Accordingly, prior to the present invention there have been acute, unmet needs for screw-type processing equipment such as single screw extruders and other similar equipment which could combine the generally desirable characteristics of such equipment with improved dispersive mixing ability.

SUMMARY OF THE INVENTION

The present invention addresses these needs.

One aspect of the present invention provides a machine for processing solid and viscous plastic and polymeric materials comprising a hollow barrel defining a barrel chamber. The barrel has an inner surface, an outer surface, a first end, a second end, and a longitudinal axis extending between the ends. The barrel defines axial directions along the axis, radial directions traverse to the axis and circumferential directions around the axis. The present invention also includes inlet means for introducing a material into the barrel chamber, and a screw extending along and rotatable about the longitudinal axis in a circumferential rotation direction. The screw has a first end adjacent the first end of the barrel and a a second end adjacent the second end of the barrel.

The screw includes a shearing flight extending to a spaced distance from the inner surface of the barrel, and the flight shears material between the shearing flight and the inner surface of the barrel. The screw also includes a scraping flight radially extending to adjacent the inner surface of the barrel, and the scraping flight removes material from the inner surface of the barrel. The flights are constructed and arranged such that upon rotation of the screw in the rotation direction, the scraping flight collects and guides the material to the shearing flight.

Desirably, the shearing flight and scraping flight are helically disposed on the screw. The screw may include a helical thread extending about the longitudinal axis which has a shearing flight at one portion of the thread and a scraping flight at another portion of the thread. A plurality of such threads may be included in the apparatus. Further, each thread may include a plurality of shearing and scraping flights such that the shearing flights alternately follow the scraping flights in series along each thread.

Preferably, the shearing flight of one of the threads is followed in the rotation direction by the shearing flight of another thread. Alternatively, the shearing flight of one of the threads may be followed in the rotation direction by the scraping flight of another thread. Yet further, the shearing flight of one of the threads may be followed in the rotation direction by both a scraping flight and a shearing flight of another thread.

One thread may continuously extend from a first spaced distance from the first end of the shaft to a second spaced distance from the second end of the shaft and another thread may continuously extend from a different first spaced distance from the first end of the shaft and a different second spaced distance from the second end of the shaft.

Preferably, at each axial location along the screw, the spaced distance between the shearing flight and the inner surface of the barrel gradually decreases in the direction opposite the rotation direction until the shearing distance reaches a minimum spaced distance. This minimum spaced distance is a shearing flight tip, which may be rounded. Also, the portion of the scraping flight closest to the inner surface of the barrel, the scraping flight tip, may have a scraping corner adjacent the inner surface of the barrel. The may be substantially rectangular.

The apparatus may also comprise a second barrel chamber having a second longitudinal axis and a second shaft extending along the second longitudinal axis, whereby the barrel chamber communicates with the second barrel chamber via an opening.

Desirably, the scraping flight radially extends to the inner surface of the barrel. Alternatively, the scraping flight may radially extend to a spaced tolerance distance from the inner surface of the barrel, and the spaced distance between the shearing flight and the inner surface of the barrel, the shearing distance, may be greater than the tolerance distance. The shearing distance also may be greater than ten times the tolerance distance. Preferably, the tolerance distance is about 0.2% of the radial distance from the longitudinal axis to the inner surface of the barrel.

Where the total shearing length is defined as the totalled sum of the periods of all of the shearing flights, and the total scraping length is defined as the totalled sum of the periods of all of the scraping flights, the total scraping flight may be greater than the total shearing length. Alternatively, the total scraping flight may be less than the total shearing length. Yet further, the total scraping flight may be about equal to the total shearing length.

Preferably, the number of threads is equal to four, and the helix angle of the threads is about equal to about 17–18 degrees.

Desirably, the screw defines a plurality of channel sections between the threads where channel section has a channel surface which is radially spaced from the barrel wall by a channel depth. At least one of the channel sections is bounded in the rearward direction by a scraping flight and has a channel depth which is at a maximum adjacent the bounding scraping flight and which decreases in the forward direction away from the scraping flight. Further, the channel section may be bounded in the forward direction by one of the shearing flights, and the channel depth may be at a minimum adjacent the bounding shearing flight and increase in the rearward direction away from the scraping flight. Yet further, the channel section is further bounded by a second shearing flight which is connected to the bounding scraping flight at a connecting point and has a channel depth which increases immediately adjacent the bounding scraping flight and the bounding second shearing flight in the directions away from the connecting point.

In another aspect of the claimed invention, a machine for processing solid and viscous plastic and polymeric materials comprises a hollow barrel defining a barrel chamber, the barrel having an inner surface, an outer surface, a first end, a second end, and a longitudinal axis extending between the ends. The barrel defines axial directions along the axis, radial directions traverse to the axis and rotational directions around the axis. The machine also comprises an inlet means for introducing a material into the barrel chamber, and a shaft extending along the longitudinal axis and having a first end adjacent the first end of the barrel and a second end adjacent the second end of the barrel.

A plurality of screw segments are disposed on the shaft, and each screw segment is capable of rotating in a circumferential direction. Each screw segment includes either a scraping flight for removing the material from the inner surface of the barrel, or a shearing flight radially extending to a spaced distance from the inner surface of the barrel. Upon rotation of the screw segments, the scraping flight collects and guides the material to at least one of the shearing flights of at least one of the screw segments, and the material is sheared between the shearing flight and the inner surface of the barrel.

Preferably, each screw segment includes at least one shearing flight and at least one scraping flight.

In yet another aspect of the present invention, a screw element for processing and mixing materials comprises a body defining upstream and downstream ends, a longitudinal axis extending between the ends and forward and rearward circumferential directions about the longitudinal axis. The screw element also includes a plurality of flights spaced apart from one another and a plurality of channels between the flights. The flights include at least one scraping flight having a crest at a scraping radius from the axis and at least one shearing flight having a crest at a shearing radius from the axis, the shearing radius being less than the scraping radius. The flights are constructed and arranged so that upon rotation of the screw in the forward circumferential direction within a barrel, the scraping flight collects material disposed within the barrel and guides the material to the shearing flight.

Preferably, the flights are generally helical.

Desirably, the shearing flight has an inlet surface extending from the channel rearward of the crest of the shearing flight. The inlet surface slopes radially outwardly in the rearward circumferential direction toward the crest of the shearing flight so as to define a smooth transition from the channel to the crest of the shearing flight. Further, the shearing flight may have an outlet surface extending rearwardly from the crest of the shearing flight, the outlet surface sloping radially inwardly in the rearward circumferential direction away from the crest so as to define a smooth transition from the crest of the shearing flight to a channel.

The screw element may also have a shearing flight whose leading surface faces in the circumferentially forward direction and extends substantially radially outwardly.

The screw element may further include a plurality of shearing and scraping flights. The plurality of scraping and shearing flights may be arranged in alternating sequence around the circumference of the body at a first axial location. The plurality of scraping and shearing flights may also include a plurality of scraping flights at a first axial location and a plurality of shearing flights at a second axial location.

Yet further, the flights of the screw element preferably include first and second sets of flights extending in axially opposite directions from a common meeting plane, the flights of the first and second sets being offset from one another in circumferential directions at the meeting plane so as to define discontinuities between flights at the meeting plane.

Preferably, the body includes a plurality of generally cylindrical body sections, each body section carrying at least one of the flights, and means for securing the body sections to one another in coaxial, end-to-end relationship. The securing means may be operative to secure the sections to one another in a plurality of different relative positions in the circumferential directions, whereby the relative circumferential positions of the flights on the sections may be adjusted.

The flights may also constitute a plurality of substantially continuous, generally helical threads extending from adjacent the upstream end to adjacent the downstream end, each thread including a plurality of flights.

Preferably, the shearing radius is less than the scraping radius by a difference equal to between about 0.2% and about 0.4% of the scraping radius.

The advantages and flexibility of the present invention apply in almost any context where dispersive mixing, extensive mixing, composition or temperature homogenization, melting and mixing and devolatilization is desirable.

DETAILED DESCRIPTION OF THE PREFERRED EMBODIMENTS

Figure 1:
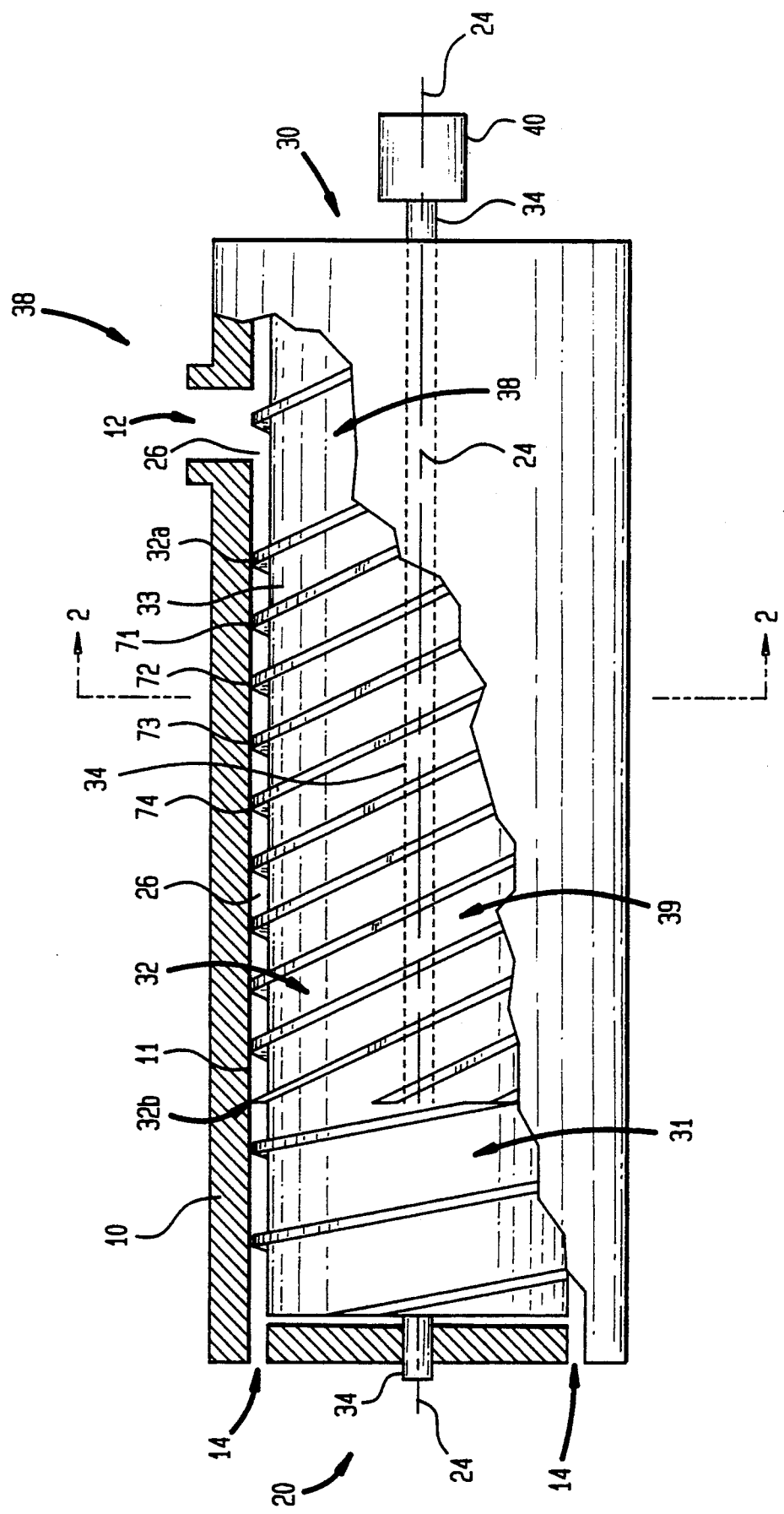
FIG. 1 is a diagrammatic partially sectional view of a compounder in accordance with one embodiment of the invention.

FIG. 1 depicts the general layout of a compounding extruder in accordance with one embodiment of the invention. A tubular, generally cylindrical barrel 10 provides an inlet port 12 at a first or upstream end 30 of the barrel and an outlet port 14 at the other or downstream end 20 of the barrel. A shaft 34 extends from upstream end 30 to downstream end 20 of the barrel along the longitudinal axis 24 of barrel 10. The shaft is supported for rotation within the barrel about axis 24. At upstream end 30, shaft 34 extends beyond the end of barrel 10 and is connected to rotary drive device 40. Rotary drive device 40 may include a conventional motor and gear train (not shown) arranged to rotate the shaft in a preselected direction of rotation 46 about axis 24.

For ease of reference, directions are stated in this disclosure with reference to the longitudinal axis 24. Thus the terms "axial" and "axially" should be understood as referring to the directions parallel to the longitudinal axis, whereas the terms "radial" and "radially" should be understood as referring to the directions transverse to this axis. The term "radially inward" refers to the directions towards the axis, whereas "radially outward" refers to the directions away from the axis. "Circumferential" or "rotational" directions refer to the directions around axis 24 such as that indicated by arrow 46.

A generally cylindrical screw element 32 is mounted on shaft 34 coaxially therewith, so that the axis of screw element 34 is coincident with the axis 24 of the barrel.

The screw element has an upstream end 32a disposed at the upstream end 30 of the barrel and a downstream end 32b disposed at the downstream end 20 of the barrel. Screw 32 has a body 33 and a mixing section 39 with four helical threads 71-74. Helical threads 71-74 are formed integrally with body 33, and wrap around the body from over the upstream to downstream length of mixing section 39. Screw 32 further includes a feed section 38 upstream of mixing section 39 and a metering section 31 downstream of the mixing section. The feed section and metering section are of generally conventional construction as commonly employed in extruder screws. For example, the feed section may include one or more threads and channels of constant or progressively decreasing cross-sectional area, whereas the metering section typically includes one or more threads and channels having relatively small cross-sectional area so as to restrict or meter flow of material through the apparatus.

Figure 2:
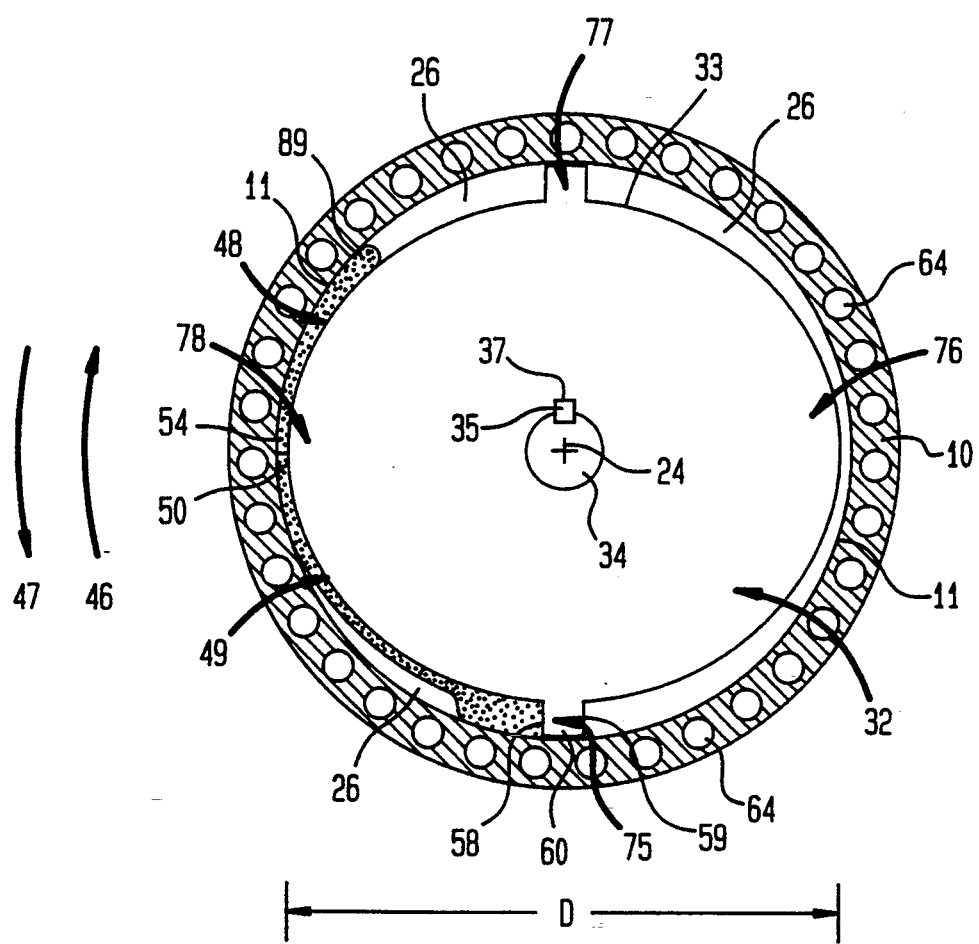
FIG. 2 is a sectional view taken along line 2—2 in FIG. 1.

As used herein, the term "helical" does not necessarily imply that a structure completes a full rotation about the longitudinal axis. "Helical" also refers to those structures which both form an arc of a circle in the rotational direction, and which also extend in the axial direction. The terms "forward" and "rearward" are used herein with respect to circumferential or rotational directions around axis 24. As so used, the "forward" direction is the direction corresponding to the direction of rotation which would appear to move the threads of the screw towards the downstream end of the barrel. Thus, for a right-hand screw as illustrated in FIGS. 1 and 2, the clockwise direction of rotation as seen from the downstream end 20 of the screw is the forward direction, whereas the counterclockwise direction as seen from the downstream end is the rearward direction. For a left-handed screw, these directions would be reversed. A first point described as being "before" a second point in the rotational direction shall mean that the first point is disposed in the forward rotational direction from the second point. A first point being described as "following" a second point in the rotational direction shall mean that the first point is disposed rearwardly of said second point. The four threads 71-74, inner barrel surface 11, and screw body 33 cooperatively define helical spaces or "channels" 26. The distance between screw body surface 33 and inner barrel surface 11 is referred to as the "channel depth".

As shown in cross-sectional view in FIG. 2, screw element 32 is disposed concentrically about shaft 34. Screw 32 maintains a fixed position with respect to shaft 34 via key 35. Key 35, which is integral with shaft 34, extends radially outward from shaft 34 and fits into accepting slot 37 of screw 32. As slot 37 is substantially the same shape as key 35, rotation of shaft 34 will cause likewise rotation of screw 32. However, while screw 32 has a fixed rotational relationship with shaft 34, key 35 does not prevent axial movement of screw 32 along shaft 34. Therefore, screw 32 may be removed and replaced on shaft 34 by axially sliding the screw element on and off the shaft. During operation, axial movement of screw 32 is prevented by a stop (not shown).

FIG. 2 also illustrates the configuration of the four threads 71-74 at a particular axial location along the screw, i.e., at a particular distance from the upstream end 32a of the screw, and hence at a particular axial distance from the upstream end 30 of the barrel 10. Specifically, a portion 75 of thread 71 is shown in cross-section, as is a portion 76 of thread 72, a portion 77 of thread 73, and a portion 78 of thread 74.

The portion 78 of thread 74 shown in FIG. 2 is configured as a shearing flight. The portion of the shearing flight 78 closest to the inner barrel surface 11 is shearing tip or crest 50. An inlet surface or shearing feed area 48 begins forwardly of shearing crest 50, in a channel 26, and slopes radially outwardly in the rearward circumferential direction so as to provide a smooth transition between the channel and the shearing tip or crest. An outlet surface 49, also referred to as a scraping feed area, extends rearwardly from the shearing tip or crest 50 towards the next following channel 26. Outlet surface 49 slopes radially inwardly in the rearward circumferential direction. The shearing tip or crest 50 is rounded to provide a smooth transition from the region immediately before the shearing tip (inlet or shearing feed surface 48) to the area immediately after the shearing tip in the rotation direction 46 (outlet or scraping feed surface 49).

The tip or crest 50 of the shearing flight lies at a shearing radius $R_{shear}$ from axis 24. The shearing radius is less than the radius $R_{barrel}$ of barrel 10 by a preselected shearing clearance $C_{shear}$ so that there is a gap 54 between shearing tip or crest 50 and the inner surface 11 of the barrel. This narrow gap between shearing tip 50 and inner barrel surface 11 is small enough to provide high shearing forces to any material passing through the gap. However, narrow gap 54 is not so small that it prevents compounding material from passing from the shearing feed area 48 to the other side of the shearing tip. The distance between screw surface 33 and inner barrel surface 11 increases with increasing circumferential distance from shearing tip 50. In other words, in shearing feed area 48, the distance between the surface of screw body 33 and inner barrel surface 11 tapers to the narrow gap 54. In the outlet or scraping feed region 49, the surface of screw body 33 is similarly tapered. Portion 76 of thread 72 is likewise configured as a shearing flight, with the identical cross-sectional structure of shearing flight 78.

In contrast to shearing flights 78 and 76, portions 75 and 77 of threads 71 and 73, respectively, are configured as scraping flights. Scraping flight 75 has a leading wall 58 facing forwardly towards shearing flight 78 and scraping feed region 49 and a trailing wall 59 facing rearwardly towards the other shearing flight 76. The leading and trailing walls of the scraping flight extend substantially radially outwardly from the surface of screw body 33 to the outermost tip or crest 60 of the scraping flight. Almost directly abutting inner barrel surface 11 is scraping tip 60 of scraping flight 75. Scraping tip 60 forms a sharp or almost sharp corner with leading wall 58, preferably at a right angle. Thus the scraping tip 60 is disposed at a scraping radius $R_{scrape}$ greater than the shearing radius $R_{shear}$ of the shearing flights, so that the scraping tip or crest 60 is disposed at only a very small tolerance distance from the inside surface 11 barrel. This tolerance distance $D_t$ (the difference between the scraping radius $R_{scrape}$ and the interior radius of the barrel $R_{barrel}$) should be as small as practicable and should be small enough to substantially prevent compounding material from passing between the scraping flight and the barrel. Preferably, the tolerance is less than about 0.4%, and more preferably about 0.2% of the radial distance from the longitudinal axis 24 to inner barrel surface 11. The diameter of screw element 32 is defined as twice the radial distance from longitudinal axis 24 to the tip 60 of scraping flight 75.

In essence, the scraping flight provides an area of very tight flight clearance, i.e., very little distance between the tip of the scraping flight and the inner surface of the barrel, and the shearing flight provides an area of loose flight clearance, i.e., the tip of the shearing flight is a relatively larger spaced distance from the inner surface of the barrel than the scraping flight. Stated another way, the shearing gap clearance $C_{shear}$ is substantially larger than the tolerance distance. Although the optimum value of the shearing gap clearance will vary depending on the application, a shearing gap clearance equal to about 2% to about 7% of the scraping radius or barrel radius, and more desirably about 3% to about 6% of the scraping radius or barrel radius, can be used. A shearing gap clearance of about 4.5% of the scraping radius is particularly desirable. The preferred length of the clearance may be effected by numerous variables, including the operating screw speed, the nature of the materials, and the barrel size.

Barrel 10 includes axially-extending holes 64, through which a cooling medium, such as water, is provided to cool the barrel and materials in contact with the barrel.

Figure 3:
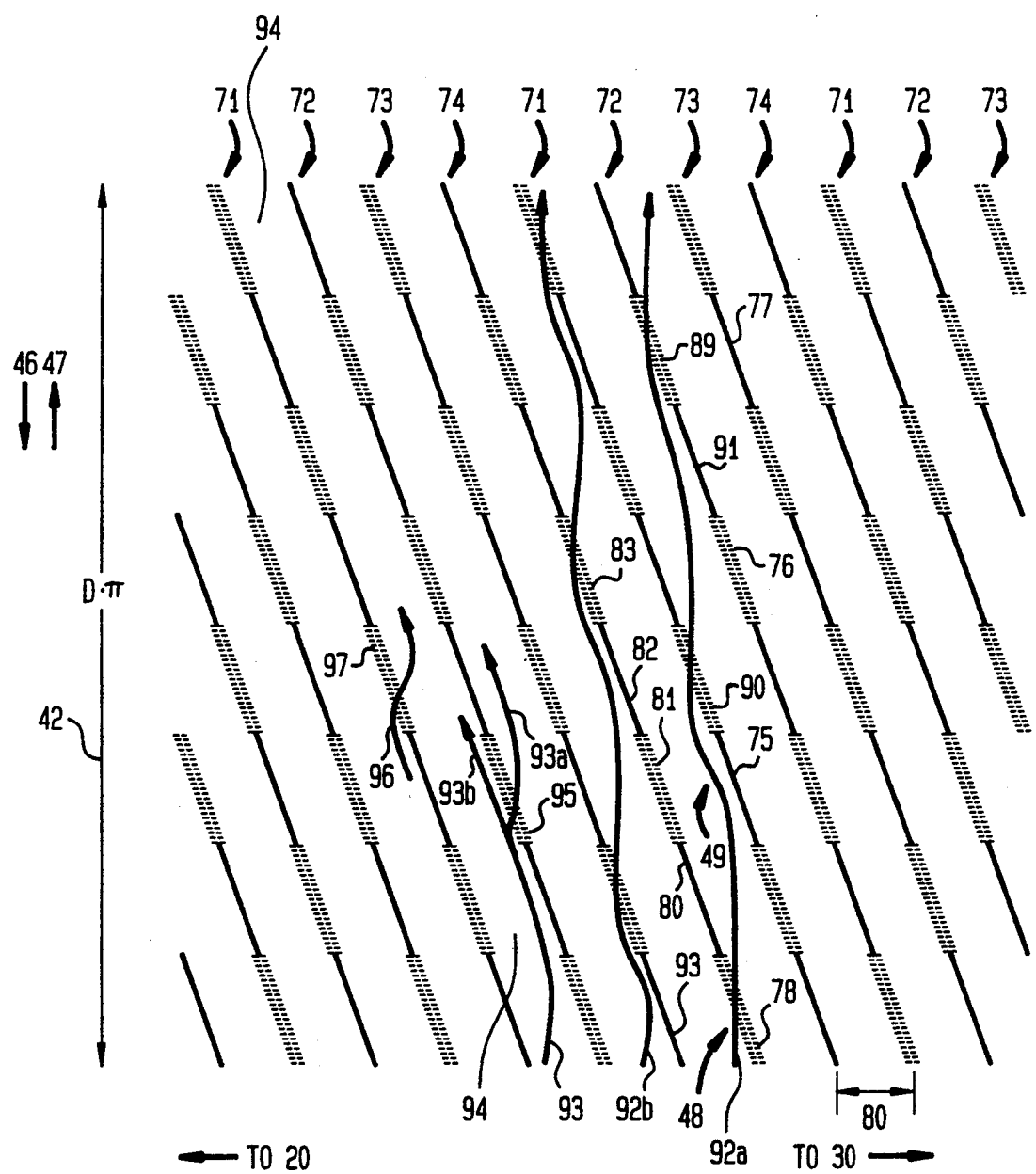
FIG. 3 is a projection of the threads of a screw in accordance with one preferred embodiment of the present invention.

FIG. 3 illustrates how the shearing and scraping flights alternate along the threads. FIG. 3 is a projection of a schematic of the threads, as if screw element 32 were rolled through one complete rotation along a flat surface and threads 71–74 left the markings shown in the figure. As shown by dimension 42, the distance covered by one full rotation of screw element 32 is equal the circumference, or diameter D of screw 32 multiplied by Pi. Only a portion of the entire axial length of the screw is shown; screw element 32 continues in the direction of the ends 20 and 30 as indicated.

Within the mixing section 39, each thread alternates in the axial direction from a scraping flight to a shearing flight along its entire length. For example, thread 74 includes shearing flight 78, followed in the axial direction 43 by scraping flight 80, followed by shearing flight 81, followed by scraping flight 82, followed by shearing flight 83, etc. Scraping flights are shown as solid lines, while shearing flights are shown as broken lines.

As shown in the preferred embodiment of FIG. 2 and as shown in the projection of the preferred embodiment in FIG. 3, the shearing and scraping flights also alternate in the rotational direction. Specifically, shearing flight 78 of thread 74 is followed in the rotation direction 46 by scraping flight 75 of thread 71. Likewise, scraping flight 75 is in turn followed in the rotation direction 46 by shearing flight 76 of thread 72, which is in turn followed by scraping flight 77 of thread 73, and which is in turn followed by shearing flight 78 of thread 71, thus completing the cycle. The period of individual shearing and scraping flights is measured with respect to the length of the individual flight in the rotational direction 46, and if the flights are all of equal length, the period is equal to:

$$\frac{(\text{circumference})}{(\text{total number of shearing and scraping flights})}$$

Accordingly, because there are four shearing flights and four scraping flights of equal length, the period of the individual shearing flights and scraping flights of the preferred embodiment will be D*Pi/8. The channel width 80 between any two threads is equal to the distance between the threads in the axial direction 43.

In operation, material such as a polymer and an additive to be compounded is deposited through inlet port 12 into the feed section 38. In the feed section, the polymer is brought to a fluid or partially fluid condition (as by melting where the polymer is a thermoplastic) and advanced to the mixing section 39 where it enters channels 26 between the screw threads 71-74, screw 32, and inner barrel surface 11. Rotary drive device 40 rotates shaft 34, and hence screw element 32, in the forward rotational direction 46 about longitudinal axis 24.

As screw 32 rotates, any material present in channels 26 will come in contact with either a scraping flight or shearing flight of the threads. For example, as shown in FIG. 2, as material 90 accumulates in the shearing feed area 48, some of the material will eventually be pushed through narrow gap 54 between shearing tip 50 and barrel inner surface 11 due to the rotation between the screw and barrel.

As the material 90 passes through clearance 54, the material will experience high shear stresses between shearing tip 50 and inner barrel surface 11. These high shear stresses will rupture the solid particles into fragments, thus compounding the solid fragments into the surrounding fluid polymer matrix. After the material 90 passes through the high stress clearance 54, it will accumulate in front of scraping flight 75 in scraping feed area 49.

Because of the extremely tight flight clearance between scraping tip 60 and inner barrel surface 11, the material will not be able to pass over scraping flight 75, but will instead collect along wall 58 and in scraping feed area 49.

From there, a typical flow pattern for the material is shown as path 92a in FIG. 3. Because the material cannot pass over scraping flight 75, it will be moved in the barrel rotation direction 47 along scraping flight 75 of thread 71, until it encounters shearing flight 90 of the same thread. The material will pass over shearing flight 90, where it will again experience high stress and a rupturing of the solids. After the material passes over shearing flight 90, it will be gathered by scraping flight 91 of the following thread 72. Scraping flight 91 will guide the material to shearing flight 89 of the same thread, where it will again experience high shearing forces. As shown by path 92b, after the material passes over shearing flight 89, the material will be collected by scraping flight 93 of the following thread 73.

This process of shearing, scraping, guiding to shearing a flight, and then shearing again continues as the material travels down the length of the screw. The repeated shearing will result in a highly effective compounding of the material. The helical nature of the screw, the continuous of influx of material into the screw, and the rotation of the screw all combine to force the material from upstream end 30 towards downstream end 20. Eventually, the material will pass through the metering section 31 and out of the extruder 1 via outlets 14.

Although paths 92a and 92b show one possible route a given particle of material may take through the compounder, the probable path for most of the material is contemplated to be different. For example, the size of narrow gap 54 for the shearing portions is preferably not so large that all the material in shearing feed area 48 will pass through the gap. Rather, most of the material should take a path similar to path 93, where a portion of the material 93a in channel 94 passes over shearing flight 95 of thread 72, and the rest of the material 93b continues down channel 94, to be eventually sheared by another shearing flight. Further, the material 93b traveling down channel 94 will mix with the material 96 entering channel 94 via shearing flight 97. Consequently, the nature of the alternating shearing and scraping flights allows for not only a great deal of high stress areas, but also a great deal of random mixing. A particular stream of material will be split apart and recombined with other streams of materials many times before finally exiting compounder 1 via outlets 14.

Extruder 1 is extremely effective in accomplishing four important aspects of a good compounder. First, it provides high shear stress regions by passing the material through narrow gap regions. Second, it has a flow pattern which brings about repeated passages through the high shear regions.

Third, it provides good extensive mixing. With typical flow paths such as that shown by paths 93 and 96 in FIG. 3, streams of material will be split and recombined as the screw rotates, thus providing extensive mixing.

Fourth, it provides good temperature control in the shearing regions. Generally, shear stress is a product of viscosity and shear rate, and as the temperature increases, viscosity drops and stress levels become insufficient for rupturing agglomerates. Extruder 1 prevents the temperature from exceeding unacceptable levels by its cooling tubes 64, the scraping flights 75, and the shearing flights 58. The inner surface 11 of barrel 10 is cooled by passing a cooling medium such as water through tubes 64. Scraping flight 52 removes material from the inner surface 11 of barrel 10, thus preventing material from accumulating as a stationary layer on the interior surface of the barrel and insulating the rest of the material from heat transfer. Thus, the scraping flights aid in maintaining a relatively high heat transfer coefficient on the interior surface of the barrel. Therefore, when material passes through the narrow gap between shearing tip 50 and inner barrel surface 11, the material will remain at a relatively low temperature, thus securing the high stress levels required for effective dispersion.

The screw and extruder as described above can be used in achieving dispersion, phase contacting and/or heat transfer with many fluid or semifluid materials. As mentioned above, a particularly preferred application is in forming dispersions where one or both phases are polymeric materials as, for example, in incorporation of additives such as pigments, stabilizers, fire retardants, antimicrobial agents and fillers into polymers. However, the screw and extruder may also be used with systems where both phases are polymers. The present compounding extruder is especially relevant to the dispersion of noncompatible polymers for the preparation of blends and alloys in addition to routine compounding. The repeated stress regions and mixing will prevent non-compatible plastics from separating after the material leaves the screw.

Due to the leakage of material from one channel to another, extruders and screws as described above provide for extensive mixing independent of the high stress rates. They are also useful in causing reactions between two separate materials, because good reactions require good mixing.

Screws as described above are also applicable to melting and devolatilization (i.e., removal of low molecular weight volatile components such as residual solvents monomer, etc.). These are important unit operations carried out in processing machines. In the melting process, at the point the material is partially molten, repeated shearing and scraping of the partially molten material effectively completes the melting process and creates a homogeneous molten mass of material. The source of the melting energy is the conversion of mechanical energy into heat in the high shear regions. This is termed as "dissipative-mix-melting". In devolatilization, the molten material in a partially filled machine is exposed to high vacuum. The volatile material diffuses through the exposed surfaces to the vapor space. Repeated shearing and scraping of the material will effectively devolitize the material such that all the material is repeatedly exposed to the high vacuum vapor space.

The invention allows for a variety of options, many of which directly affect the typical stream paths of the material through the screw, and, thus, the dispersive behavior.

Many configurations of the shearing and scraping flights are possible. For example, in FIG. 3, at any particular point along the screw, the shearing and scraping flights alternate in the rotation direction 46. In another preferred embodiment, FIG. 4, the shearing and scraping flights do not alternate in the rotation direction. Rather, in rotation direction 146, each shearing flight is followed by another shearing flight, and each scraping flight is followed by another scraping flight. For example, shearing flight 121 of thread 111 is followed in the rotation direction 146 by shearing flight 122 of thread 112. Likewise, shearing flight 122 is followed in the rotation direction by shearing flight 123 of thread 113, shearing flight 123 is followed in the rotation direction by shearing flight 124 of thread 114, and shearing flight 124 is followed in the rotation direction by shearing flight 121 of thread 111, thus completing the cycle.

Figure 4:
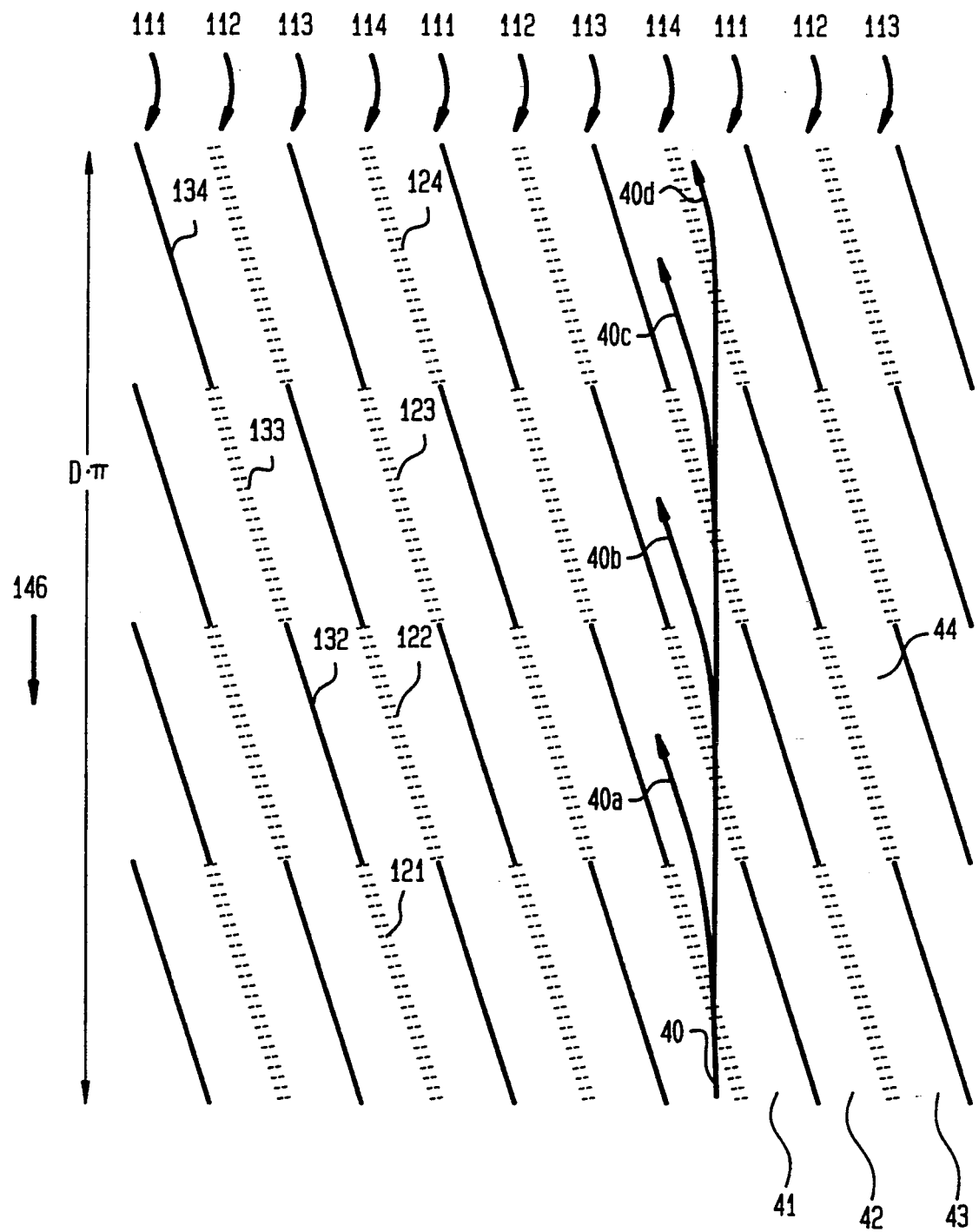
FIG. 4 is a projection of the threads of a screw in accordance with another preferred embodiment of the present invention.

FIG. 4 also shows a variation in the period of the scraping and shearing flights. As there are four scraping and shearing flights along a single rotation of one thread, as shown by shearing and scraping flights 121, 132, 133, and 134, the period of the individual shearing and scraping flights is D*Pi/4.

Although the present invention is not limited by any theory of operation, the preferred embodiment of FIG. 4 is contemplated to provide a different flow path than the preferred embodiment of FIG. 3. Because the shearing flights are larger (in period) and immediately follow one another in the rotation direction, the material to be compounded will experience a higher number of passes than the embodiment of FIG. 3. Path 40 illustrates that a particular portion of the material might pass through quite a few shearing flights before it is diverted along paths 40a, 40b, 40c, or 40d, and before flowing into channels 41, 42, 43, or 44, respectively. Because it is contemplated that more material will pass over the shearing flights than travel down the channels as compared to the preferred embodiment of FIG. 3, the velocity of the flow of material through the individual channels in FIG. 4 will decrease, and, therefore, the flow velocity throughout the entire screw will also decrease.

Figure 5:
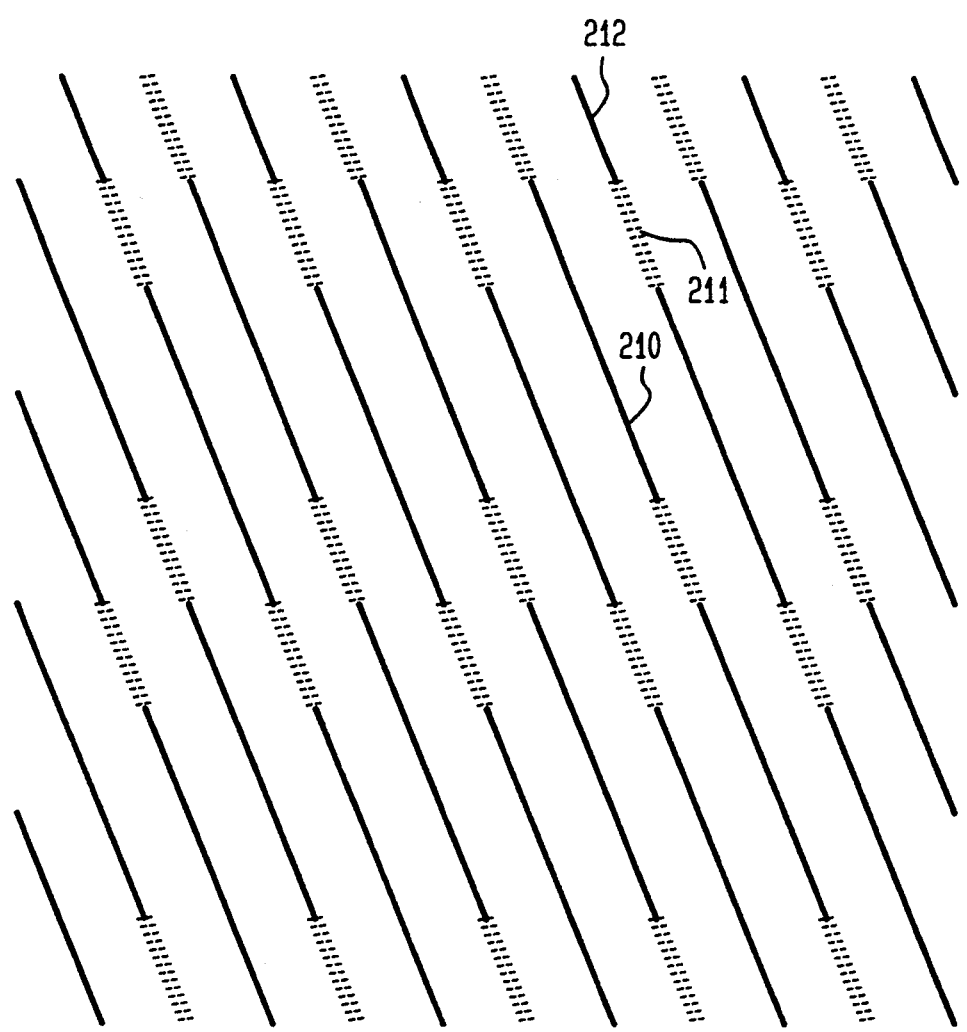
FIG. 5 is a projection of the threads of a screw in accordance with yet another preferred embodiment of the present invention.

FIG. 5 shows yet another preferred embodiment, where the periods of the scraping and shearing flights are variable, and where a a portion of a scraping flight 210 is followed in the rotation direction by a shearing flight 211, and another portion of scraping flight 210 is followed in the rotation direction by another scraping flight 212. By varying the periods of the individual flights and their axial position with respect to one another, it is contemplated that a large variety of parameters can be emphasized or deemphasized, such as the average number of shearing passes for a given particle of material, the percentage of material experiencing shearing passes, the flow rate of the material, and the extent of mixing of different streams. For example, if the period and number of scraping flights are substantially greater than the period and number of shearing flights, then more of the material will tend to travel down the same channel, without passing through high stress regions or mixing with other streams. Likewise, if the period and number of shearing flights are substantially greater than the period and number of scraping flights, then while the material will experience repeated stress and extensive mixing with other streams, it will probably not flow as quickly down the channels, and the overall flow rate for the compounder will decrease.

While FIGS. 4-5 are all directed to a four-flighted screw, i.e., a screw with four threads, it is also possible to increase or decrease the total number of threads.

It is also possible to change the angle of the threads to affect the flow material through the compounder. For example, FIGS. 3-5 all show a four-flighted square-pitched screw with a 17-18 degree helix angle. The helix angle could be increased or decreased depending on the needs of the material to be compounded. Because large helix angles provide better pumping performance, it contemplated that large helix angles are particularly advantageous in a compounder of the present invention because the increased pumping performance will compensate for the leakage of material over the shearing flights. It is also possible to vary the helix angle with increasing axial distance from one of the screw ends.

Figure 7:
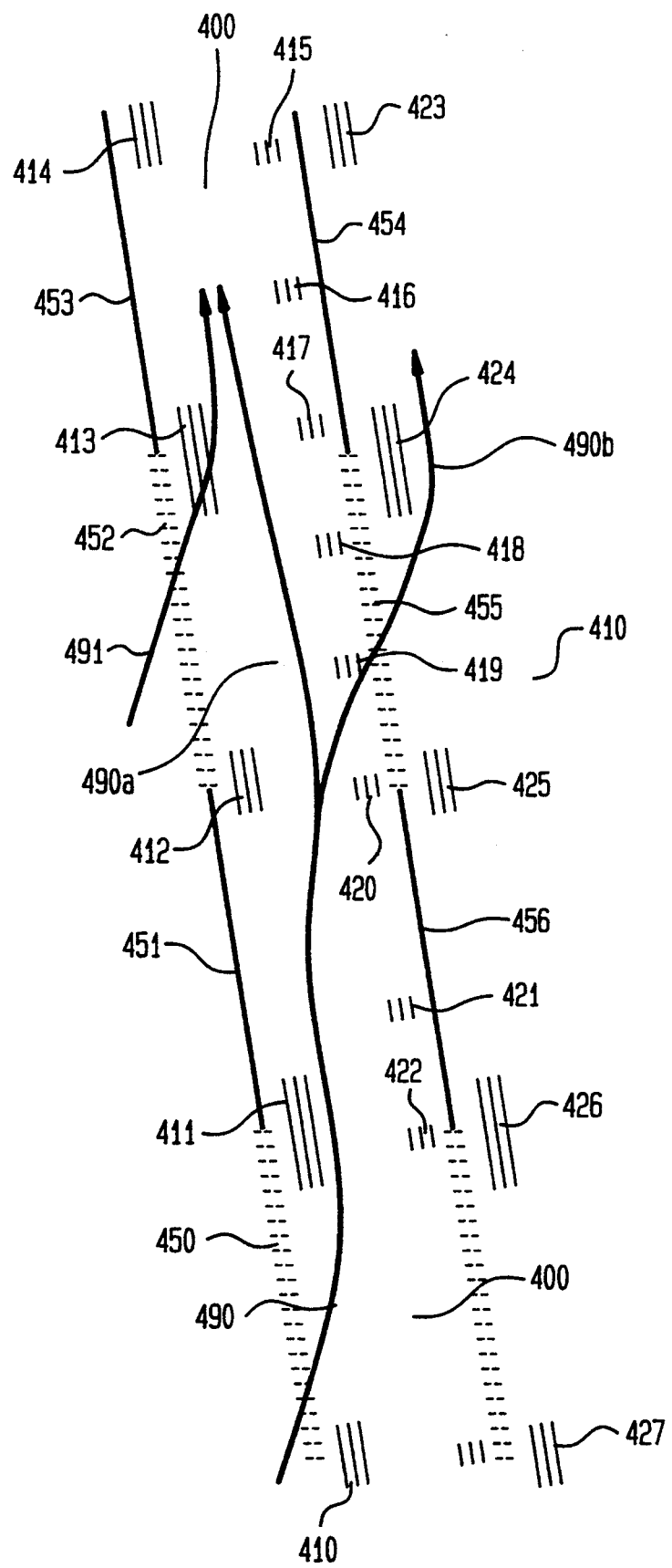
FIG. 7 is a schematic view of yet a further preferred embodiment of the present invention.

Yet another parameter which may be varied is the channel depth. FIG. 7 illustrates a manner of varying the channel depth in order to effect the flow path. The length of hash marks 410-427 indicate the depth of the channel at that point, such that the longer hash marks indicate greater depth (hereinafter "deep") and the shorter hash marks indicate lesser depth (hereinafter "shallow"). Specifically, channel 400 is "deep" at hash marks 411, 413, and channel 410 is deep at hash marks 424 and 426. The channel 400 is "shallow" at hash marks 415-422, and "medium" at hash marks 410, 412, and 414. Channel 410 is also medium at hash marks 423, 425, and 427.

Path 490 indicates a typical path of material through channel 400. As the material passes through shearing flight 450, it is contemplated that the material will accumulate in the deeper sections of the channel, namely near hash mark 411 and adjacent to scraping flight 451, and away from the more shallow portions of the channel (hash marks 420-422). As the screw rotates and forces the material down channel 400, the channel depth adjacent scraping flight 451 decreases towards medium hash mark 412, forcing more of the material towards the middle of the channel. Accordingly, despite the fact that channel 400 is shallow near shearing flight 455 (as indicated by hash marks 417-420), some of the material 490b will pass over the shearing clearance and into channel 410. However, most of the material 490a will be forced away from shearing flight 455 because of the shallow depth, and will enter the deeper portion of the channel near hash mark 413. There, the material 490a will mix with the material 491 passing over shearing flight 452. The combined mix of material will then continue down channel 400. Accordingly, it is contemplated that the amount of material passing through the shearing flights can be regulated not only by varying the period of the shearing flights and the position of the shearing flights with respect to the scraping flights, but also by varying the channel depths between the threads.

Figure 6:
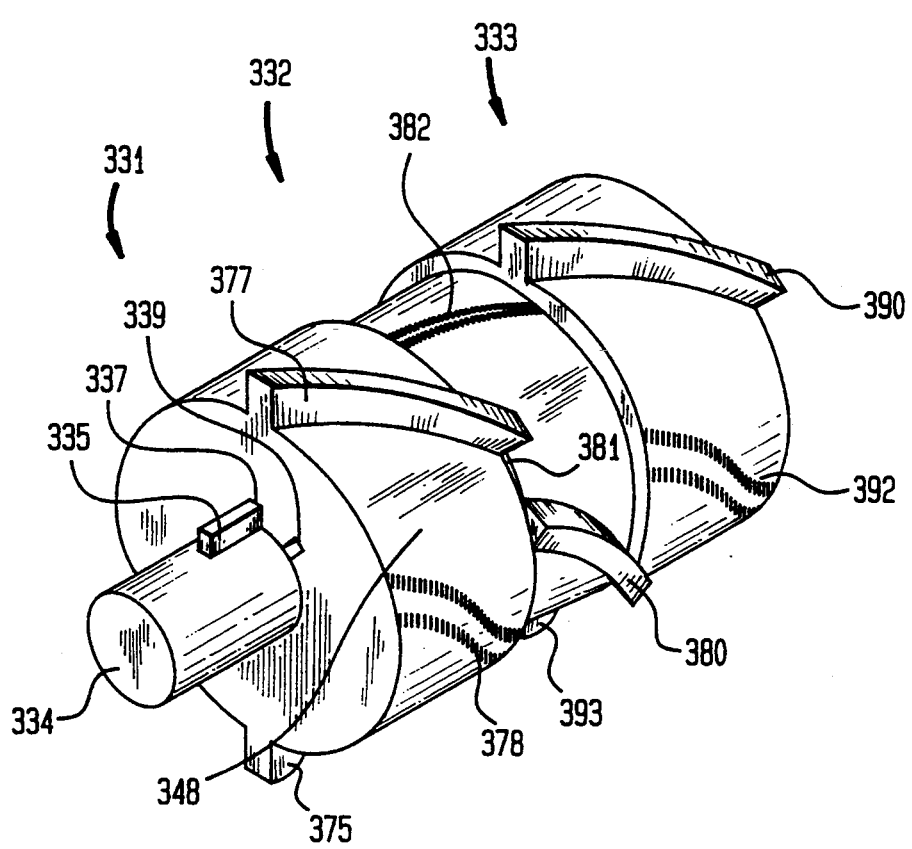
FIG. 6 is perspective view of screw segments in place on a shaft in accordance with a further embodiment of the present invention.

In order to allow users the greatest amount of flexibility in configuring their systems to their particular needs, it is preferable to break the screw element into different segments for placement on the shaft. As shown in FIG. 6, three such screw segments 331-333 are coaxially disposed on shaft 334 so that the screw segments lie in end-to-end relation with one another. Each screw segment includes slot 337 for receiving key 335, which is integral with shaft 334. Thus, all the segments maintain a fixed rotational relationship with shaft 334.

Segment 331 includes scraping flights 337 and 375, and also includes scraping flight 378 and another scraping flight (not shown). Similarly, screw segment 332 includes scraping flight 380 (and another scraping flight which is not shown) and shearing flights 381 and 382, and screw element 333 includes scraping flights 390 and 393 and shearing flight 392 (and another shearing flight which is not shown). The flights, either scraping or shearing, are not continuous at the common meeting planes between the segments. Instead, at the common meeting planes, the flights are offset from one another in circumferential directions. Thus one end of scraping flight 380 terminates at the edge of segment 332, adjacent to channel 348 between scraping flight 377 and shearing flight 378. Likewise, the other end of scraping flight 380 terminates in the channel between scraping flight 393 and shearing flight 392. It is contemplated that such circumferential offsetting and lack of continuous threads will introduce more random and extensive mixing of the material.

In essence, by using separate segments, the user can set up the screw to fit his needs to suit the material to be compounded. For example, if it is preferable for the segments to form continuous threads across the entire length of shaft 334, the segments could be rotated with respect to the shaft to form the continuous threads. As shown in FIG. 6, key 335 could be placed in slot 339 instead of slot 337 in order to form a continuous thread from segment 331 to 332, the thread being made up of scraping flight 377 and scraping flight 380.

If key 335 were placed in yet a different slot (not shown), a continuous thread could include a shearing flight 378 along segment 331, and a scraping flight 380 along segment 332. In this manner, the preferred embodiment of FIG. 3 could be created with the segments of FIG. 6, where the shearing and scraping flights alternate in both the rotational direction and axial directions.

The keys and slots mentioned above thus are arranged to secure the segments of the screw element to one another, and to the shaft, in a plurality of different relative positions in the circumferential directions. Any other mechanical arrangement which securely fastens the segments to one another can be used to accomplish the same function. Merely by way of example, the shaft and segments may be provided with corresponding splines. Alternatively, the shaft may be omitted and the segments may be connected to one another as by bolts, pins or other suitable fastening devices. If desired, the screw can be provided with internal heating and/or cooling devices.

In yet another preferred embodiment, each individual screw segment might have all shearing flights or all scraping flights. Such segments would allow the creation of the preferred embodiment in FIG. 4 if all the flights of the different segments were lined up to form continuous threads across the length of the shaft. The segments may also be used to create a non-cylindrical surface of revolution for the outer screw surface. For example, the diameter of the outer surface of the screw, whether measured from the crests of the threads or the depths of the channels, may increase or decrease with changing axial distance from the ends. Clearly, the use of segments permits an infinite number of combinations and a great amount of flexibility.

Taking into account all of the above considerations and possibilities, and although the present invention is not limited to particular dimensions or parameters, one preferred embodiment includes a six-flighted screw with a 25 degree helix angle to pump 1000 lb/hr of general purpose polystyrene (453 kg/hr) when operating at 90 RPM. The scraping flights and shearing flights are arranged similar to FIG. 3, where the scraping flights and shearing flights alternate in the rotation direction at any point along the length of the screw. The period of each individual shearing flight and each individual scraping flight is equal to $(D*Pi)/12$, such that on one revolution of one thread, there are six scraping flights and six shearing flights. The diameter of the screw is about 6 inches (15.24 cm), and the axial lead is 8.79 inches (22.3 cm). The mean channel depth is 0.2 to 0.3 inches (0.50-0.75 cm). A narrow gap distance of 56 milles provides a shearing rate of $500 \, s^{-1}$. According to fluid dynamics theory and under the above constraints, the flow rate over the shearing portions should be equivalent to one-half the net flow rate through the channels. Accordingly, the flow rate in any individual channel will tend to vary between 75% to 125% of the mean flow rate of all the channels. The average number of passes for a typical particle of material will be three. The approximate flow path for all the material will be such that 1.5% of the material in the screw experiences 0 passes or 6 passes, 9.4% will experience 1 pass or 5 passes, 23.5% will experience 2 passes or 4 passes, and 31.3% will experience 3 passes.

A screw according to the present invention may also be used in more than a single screw configuration. A screw element including shearing and scraping flights could be used in almost any processing device, compounder or mixer which uses screws, including, but not limited to, twin screw extruders (intermeshing or non-intermeshing, corotating or counterrotating), and multiple screw machines. Screws according to the present invention can also be used in screw injection molding machines, and screw blow molding machines. A screw of the present invention would replace the screw in the above machines. In fact, the advantages and flexibility of the present invention applies in almost any context where dispersive mixing is desirable.

Figure 8:
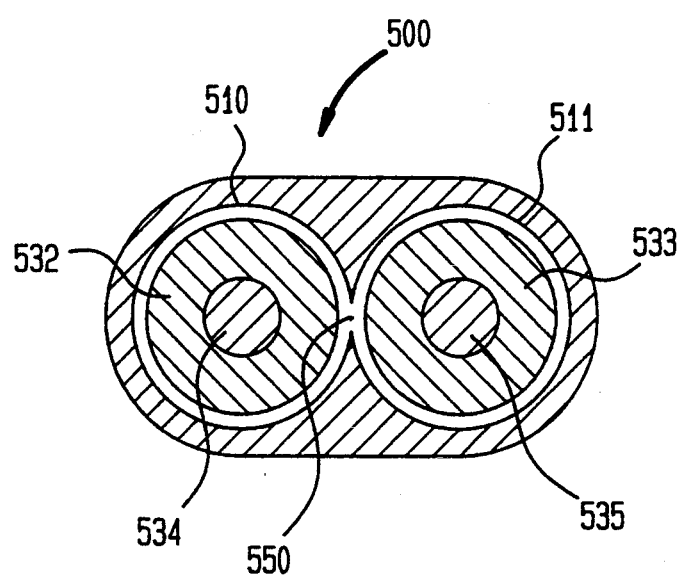
FIG. 8 is a cross-sectional view of yet another preferred embodiment of the present invention.

FIG. 8 is a cross-sectional view of non-intermeshing twin screw 500 containing two screw elements 532 and 533 disposed on shafts 534 and 535. Screw elements 532 and 533 have shearing and scraping flights as described extensively above. Screw 532 and shaft 534 are disposed within barrel chamber 510, and screw 533 and shaft 535 are disposed within barrel chamber 511. Barrel chamber 510 communicates with barrel chamber 511 via opening 550. The operation of the twin screw compounder 500 is similar to the operation discussed above, but with the additional exchange of materials from barrel chamber to the other.

As these and other variations and combinations of the features described above can be utilized without departing from the present invention as defined in the appended claims, the foregoing description of the preferred embodiments should be understood as being illustrative rather than as limiting the invention as defined in the claims.

I claim:

1. A machine for processing solid and viscous plastic and polymeric materials comprising a hollow barrel defining a barrel chamber, said barrel having an inner surface and an outer surface, said barrel having first and second ends and a longitudinal axis extending between said ends, whereby said barrel defines axial directions along said axis, radial directions traverse to said axis and circumferential directions around said axis, inlet means for introducing a material into said barrel chamber, a screw extending along said longitudinal axis and rotatable about said longitudinal axis in a circumferential rotation direction, said screw having a first end adjacent said first end of said barrel and having a second end adjacent said second end of said barrel, said screw including at least one shearing flight and at least one scraping flight, said shearing flight extending to a spaced distance from said inner surface of said barrel for shearing material between said shearing flight and said inner surface of said barrel, said spaced distance associated with said shearing flight gradually decreasing in the direction opposite the rotation direction until said spaced distance reaches a minimum spaced distance, said scraping flight radially extending to adjacent the inner surface of said barrel for removing material from said inner surface of said barrel, said shearing and scraping flights being constructed and arranged such that upon rotation of said screw in said rotation direction, said scraping flight collects and guides said material to said shearing flight.

2. The apparatus of claim 1 wherein each said shearing flight and each said scraping flight is helically disposed on said screw.

3. The apparatus of claim 2 wherein said screw includes at least one helical thread extending about said longitudinal axis, wherein one portion of said thread comprises at least one said shearing flight and another portion of said thread comprises at least one said scraping flight.

4. The apparatus of claim 3 wherein said screw comprises a plurality of said threads.

5. The apparatus of claim 4 wherein
each thread includes a plurality of said shearing flights and a plurality of said scraping flights, such that said shearing flights alternately follow said scraping flights in series along such thread.

6. The apparatus of claim 5 wherein
at one portion of said screw at a spaced distance from said first end, said shearing flight of one of said threads is followed in the rotation direction by the shearing flight of another said thread.

7. The apparatus of claim 5 wherein
at one portion of said screw at a spaced distance from said first end, said shearing flight of one of said threads is followed in the rotation direction by the scraping flight of another said thread.

8. The apparatus of claim 5 wherein
at one portion of said screw at a spaced distance from said first end, said shearing flight of one of said threads is followed in the rotation direction by both a scraping flight and a shearing flight of another said thread.

9. The apparatus of claim 4 wherein said each of said plurality of threads continuously extends from a first spaced distance from said first end of said shaft to a second spaced distance from said second end of said shaft, at least two of said plurality of threads having different first spaced distances, and at least two of said plurality of threads having different second spaced distances.

10. The apparatus of claim 4 wherein
the number of said plurality of threads is equal to four, and the helix angle of said threads is about between 17–18 degrees.

11. The apparatus of claim 4 wherein said screw defines a plurality of channel sections between said threads, each said channel section having a channel surface, said channel surface being radially spaced from said barrel wall by a channel depth, at least one said channel section being bounded in the rearward direction by one said scraping flight and having a channel depth which is at a maximum adjacent such bounding scraping flight and which decreases in the forward direction away from said scraping flight.

12. The apparatus of claim 11 wherein said at least one said channel section is bounded in the forward direction by one said shearing flight and has a channel depth which is at a minimum at adjacent such bounding shearing flight and which increases in the rearward direction away from said scraping flight.

13. The apparatus of claim 11 wherein said at least one channel section is further bounded by a second shearing flight which is connected to said bounding scraping flight at a connecting point and has a channel depth which increases immediately adjacent said bounding scraping flight and said bounding second shearing flight in the directions away from said connecting point.

14. The apparatus of claim 3 wherein
said screw defines a total shearing length equal to the sum of the periods of all of said shearing flights, and wherein said screw defines a total scraping length equal to the sum of the periods of all of said scraping flights, said total scraping length being greater than the total shearing length.

15. The apparatus of claim 3 wherein
said screw defines a total shearing length equal to the sum of the periods of all of said shearing flights, and wherein said screw defines a total scraping length equal to the sum of the periods of all of said scraping flights, said total scraping length being less than the total shearing length.

16. The apparatus of claim 3 wherein
said screw defines a total shearing length equal to the sum of the periods of all of said shearing flights, and wherein said screw defines a total scraping length equal to the sum of the periods of all of said scraping flights, said total scraping length being about equal to the total shearing length.

17. The apparatus of claim 1 wherein the portion of said shearing flight at said minimum spaced distance is a shearing flight tip, and said shearing flight tip is rounded.

18. The apparatus of claim 17 wherein the portion of said scraping flight closest to said inner surface of said barrel is a scraping flight tip, and said scraping flight tip has a scraping corner adjacent said inner surface of said barrel.

19. The apparatus of claim 18 wherein said scraping flight tip is substantially rectangular.

20. The apparatus of claim 1 further comprising
a second barrel chamber having a second longitudinal axis,
a second shaft extending along said second longitudinal axis,
said barrel chamber communicating with said second barrel chamber via an opening.

21. The apparatus of claim 1 wherein said scraping flight radially extends from said screw to said inner surface of said barrel.

22. The apparatus of claim 1 wherein
said scraping flight radially extends to a first spaced distance from said inner surface of said barrel, and
said spaced distance between said shearing flight and said inner surface of said barrel is a second spaced distance which is greater than said first spaced distance.

23. The apparatus of claim 22 wherein said second spaced distance is greater than ten times as long as said first spaced distance.

24. The apparatus of claim 23 wherein
said first spaced distance is about 0.2% of said radial distance from said longitudinal axis to said inner surface of said barrel.

25. A machine for processing solid and viscous plastic and polymeric materials comprising
a hollow barrel defining a barrel chamber, said barrel having an inner surface and an outer surface, said barrel having first and second ends and a longitudinal axis extending between said ends, whereby said barrel defines axial directions along said axis, radial directions traverse to said axis and rotational directions around said axis,
inlet means for introducing a material into said barrel chamber,
a shaft extending along said longitudinal axis and having a first end adjacent said first end of said barrel and having a second end adjacent said second end of said barrel,
a plurality of screw segments disposed on said shaft, each screw segment capable of rotating in a circumferential direction,
at least one screw segment including a scraping flight for removing said material from said inner surface of said barrel, and
at least one screw segment including a shearing flight radially extending to a spaced distance from said inner surface of said barrel, said spaced distance gradually decreasing in the direction opposite the circumferential direction until said spaced distance reaches a minimum spaced distance, said flights constructed and arranged such that said scraping flights guide material to said shearing flights,
whereby upon rotation of said screw segments, said scraping flight collects and guides said material to at least one of said shearing flights of at least one of said screw segments, and said material is sheared between said shearing flight and said inner surface of said barrel.

26. The apparatus of claim 25 wherein each said screw segment includes at least one said shearing flight and at least one said scraping flight.

27. A screw element for processing and mixing materials comprising a body defining upstream and downstream ends, a longitudinal axis extending between said ends and forward and rearward circumferential directions about said longitudinal axis, and a plurality of flights spaced apart from one another and a plurality of channels between said flights, said flights including at least one scraping flight having a crest at a first radius from said axis and at least one shearing flight having a crest at a second radius from said axis, said shearing flight having an inlet surface extending from within one said channel rearwardly to the crest of the shearing flight, said inlet surface sloping radially outwardly in said rearward circumferential direction toward said crest of said shearing flight so as to define a smooth transition from said channel to said crest of said shearing flight, said second radius being less than said first radius, said flights being constructed and arranged so that upon rotation of said screw in said forward circumferential direction within a barrel, said scraping flight will collect material disposed within the barrel and guide the material to said shearing flight.

28. A screw element as claimed in claim 27 wherein said flights are generally helical.

29. A screw element as claimed in claim 28 wherein said shearing flight has an outlet surface extending rearwardly from the crest of the shearing flight, said outlet surface sloping radially inwardly in said rearward circumferential direction away from said crest so as to define a smooth transition from said crest of said shearing flight to a channel.

30. A screw element as claimed in claim 29 wherein said shearing flight has a leading surface facing in said circumferentially forward direction and extending substantially radially outwardly.

31. A screw element as claimed in claim 28 wherein said plurality of flights includes a plurality of shearing flights as aforesaid and a plurality of scraping flights as aforesaid.

32. A screw element as claimed in claim 31 wherein said flights include scraping and shearing flights arranged in alternating sequence around the circumference of the body at a first axial location.

33. A screw element as claimed in claim 31 wherein said flights include a plurality of scraping flights at a first axial location and a plurality of shearing flights at a second axial location.

34. A screw element as claimed in claim 31 wherein said flights include first and second sets of flights extending in axially opposite directions from a common meeting plane, said flights of said first and second sets being offset from one another in circumferential directions at said meeting plane so as to define discontinuities between flights at said meeting plane.

35. A screw element as claimed in claim 31 wherein said body includes a plurality of generally cylindrical body sections, each said body section carrying at least one of said flights, and means for securing said body sections to one another in coaxial, end-to-end relationship.

36. A screw element as claimed in claim 35 wherein said securing means is operative to secure said sections to one another in a plurality of different relative positions in said circumferential directions, whereby the relative circumferential positions of the flights on said sections may be adjusted.

37. A screw element as claimed in claim 36 wherein said second radius is less than said first radius by a difference equal to between about 0.2% and about 0.4% of said first radius.

38. A screw element as claimed in claim 31 wherein said plural flights constitute a plurality of substantially continuous, generally helical threads extending from adjacent said upstream end to adjacent said downstream end, each said thread including a plurality of said flights.

39. A machine for processing solid and viscous plastic and polymeric materials comprising a hollow barrel defining a barrel chamber, said barrel having an inner surface and an outer surface, said barrel having first and second ends and a longitudinal axis extending between said ends, whereby said barrel defines axial directions along said axis, radial directions traverse to said axis and circumferential directions around said axis, inlet means for introducing a material into said barrel chamber, a screw extending along said longitudinal axis and rotatable about said longitudinal axis in a circumferential rotation direction, said screw having a first end adjacent said first end of said barrel and having a second end adjacent said second end of said barrel, said screw including four threads helically extending about said longitudinal axis, the helix angle of said threads being about between 17-18 degrees, and each said thread including at least one shearing flight and at least one scraping flight, said shearing flight extending to a spaced distance from said inner surface of said barrel for shearing material between said shearing flight and said inner surface of said barrel, and at least one scraping flight radially extending to adjacent the inner surface of said barrel for removing material from said inner surface of said barrel, said flights being constructed and arranged such that upon rotation of said screw in said rotation direction, said scraping flight collects and guides said material to said shearing flight.

40. A machine for processing solid and viscous plastic and polymeric materials comprising a hollow barrel defining a barrel chamber, said barrel having an inner surface and an outer surface, said barrel having first and second ends and a longitudinal axis extending between said ends, whereby said barrel defines axial directions along said axis, radial directions traverse to said axis and circumferential directions around said axis, inlet means for introducing a material into said barrel chamber, a screw extending along said longitudinal axis and rotatable about said longitudinal axis in a circumferential rotation direction, said screw having a first end adjacent said first end of said barrel and having a second end adjacent said second end of said barrel, said screw including a plurality of threads helically extending about said longitudinal axis, each said thread including at least one shearing flight and at least one scraping flight, said shearing flight extending to a spaced distance from said inner surface of said barrel for shearing material between said shearing flight and said inner surface of said barrel, said scraping flight radially extending to adjacent the inner surface of said barrel for removing material from said inner surface of said barrel, said flights being constructed and arranged such that upon rotation of said screw in said rotation direction, said scraping flight collects and guides said material to said shearing flight, and a plurality of channel sections between said threads, each said channel section having a channel surface, said channel surface being radially spaced from said barrel wall by a channel depth, at least one said channel section being bounded in the rearward direction by one said scraping flight and having a channel depth which is at a maximum adjacent such bounding scraping flight and which decreases in the forward direction away from said scraping flight, said at least one said channel section bounded in the forward direction by one said shearing flight and having a channel depth which is at a minimum adjacent such bounding shearing flight and which increases in the rearward direction away from said scraping flight.

41. A machine for processing solid and viscous plastic and polymeric materials comprising a hollow barrel defining a barrel chamber, said barrel having an inner surface and an outer surface, said barrel having first and second ends and a longitudinal axis extending between said ends, whereby said barrel defines axial directions along said axis, radial directions traverse to said axis and circumferential directions around said axis, inlet means for introducing a material into said barrel chamber, a screw extending along said longitudinal axis and rotatable about said longitudinal axis in a circumferential rotation direction, said screw having a first end adjacent said first end of said barrel and having a second end adjacent said second end of said barrel, said screw including a plurality of threads helically extending about said longitudinal axis, each said thread including at least one shearing flight and at least one scraping flight, said shearing flight extending to a spaced distance from said inner surface of said barrel for shearing material between said shearing flight and said inner surface of said barrel, said scraping flight radially extending to adjacent the inner surface of said barrel for removing material from said inner surface of said barrel, said flights being constructed and arranged such that upon rotation of said screw in said rotation direction, said scraping flight collects and guides said material to said shearing flight, and a plurality of channel sections between said threads, each said channel section having a channel surface, said channel surface being radially spaced from said barrel wall by a channel depth, at least one said channel section being bounded in the rearward direction by one said scraping flight and having a channel depth which is at a maximum adjacent such bounding scraping flight and which decreases in the forward direction away from said scraping flight, said at least one channel section being further bounded by a second shearing flight which is connected to said bounding scraping flight at a connecting point and having a channel depth which increases immediately adjacent said bounding scraping flight and said bounding second shearing flight in the directions away from said connecting point.

* * * * *